(12) United States Patent
Sutardja et al.

(10) Patent No.: US 7,821,731 B2
(45) Date of Patent: Oct. 26, 2010

(54) TIMING RECOVERY FOR DATA STORAGE CHANNELS WITH BUFFERED SECTORS

(75) Inventors: Pantas Sutardja, Los Gatos, CA (US); Ke Han, Fremont, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/981,921

(22) Filed: Oct. 31, 2007

(65) Prior Publication Data

US 2008/0062554 A1 Mar. 13, 2008

Related U.S. Application Data

(60) Division of application No. 11/733,728, filed on Apr. 10, 2007, now Pat. No. 7,773,325, which is a continuation of application No. 10/794,733, filed on Mar. 5, 2004, now Pat. No. 7,203,017.

(60) Provisional application No. 60/505,602, filed on Sep. 23, 2003.

(51) Int. Cl.
*G11B 5/09* (2006.01)

(52) U.S. Cl. ............... 360/51; 360/25; 360/29; 360/30; 360/53; 360/65

(58) Field of Classification Search .............. 360/51, 360/77.02
See application file for complete search history.

(56) References Cited

U.S. PATENT DOCUMENTS

| | | | |
|---|---|---|---|
| 5,258,933 A | 11/1993 | Johnson et al. | |
| 5,422,760 A * | 6/1995 | Abbott et al. | 360/46 |
| 5,424,881 A | 6/1995 | Behrens et al. | |
| 5,481,568 A * | 1/1996 | Yada | 375/340 |
| 5,513,209 A | 4/1996 | Holm | |
| 5,552,942 A | 9/1996 | Ziperovich | |
| 5,892,632 A | 4/1999 | Behrens et al. | |
| 6,009,549 A * | 12/1999 | Bliss et al. | 714/769 |
| 6,084,924 A * | 7/2000 | Melas | 375/340 |
| 6,111,710 A * | 8/2000 | Feyh et al. | 360/46 |
| 6,181,505 B1 | 1/2001 | Sacks et al. | |
| 6,185,518 B1 | 2/2001 | Chen | |
| 6,249,395 B1 | 6/2001 | Conway | |
| 6,307,696 B1 | 10/2001 | Bishop et al. | |
| 6,307,900 B1 | 10/2001 | Choi | |
| 6,313,961 B1 | 11/2001 | Armstrong et al. | |
| 6,487,032 B1 * | 11/2002 | Cloke et al. | 360/51 |
| 6,487,672 B1 | 11/2002 | Byrne et al. | |
| 6,493,403 B1 * | 12/2002 | Ashley et al. | 375/326 |
| 6,566,922 B1 * | 5/2003 | Schell et al. | 327/156 |
| 6,583,942 B2 | 6/2003 | Seng et al. | |
| 6,714,603 B2 | 3/2004 | Ashley et al. | |
| 6,801,380 B1 | 10/2004 | Sutardja | |
| 6,810,485 B2 * | 10/2004 | McEwen et al. | 713/503 |
| 6,904,111 B1 * | 6/2005 | Kolze et al. | 375/354 |
| 6,973,535 B2 | 12/2005 | Bruner et al. | |

(Continued)

*Primary Examiner*—Dismery E Mercedes (57) ABSTRACT

A storage channel, e.g., for a disk drive system, may asynchronously sample and buffer an entire sector, and then process the buffered sector to recover timing information. The storage channel may operate in an open-loop and utilize an exhaustive search to determine timing parameters. Alternatively, the storage channel may operative in a closed-loop, processing the sector once, and feeding back information obtained during decoding to the timing loop.

20 Claims, 5 Drawing Sheets

U.S. PATENT DOCUMENTS

| | | | |
|---|---|---|---|
| 7,054,088 B2 * | 5/2006 | Yamazaki et al. | 360/65 |
| 7,110,199 B2 * | 9/2006 | Sugawara et al. | 360/48 |
| 7,136,244 B1 * | 11/2006 | Rothberg | 360/53 |
| 7,466,782 B1 | 12/2008 | Patapoutian | |
| 2002/0087910 A1 * | 7/2002 | McEwen et al. | 713/503 |
| 2002/0163748 A1 | 11/2002 | Patapoutian et al. | |
| 2003/0030930 A1 | 2/2003 | Sugawara et al. | |
| 2003/0147168 A1 * | 8/2003 | Galbraith et al. | 360/53 |
| 2004/0091068 A1 | 5/2004 | Jokimies et al. | |
| 2004/0101040 A1 | 5/2004 | Agazzi | |
| 2005/0111540 A1 * | 5/2005 | Modrie et al. | 375/232 |
| 2005/0195929 A1 * | 9/2005 | Yasuda et al. | 375/355 |

* cited by examiner

TIMING RECOVERY FOR DATA STORAGE CHANNELS WITH BUFFERED SECTORS

CROSS-REFERENCE TO RELATED APPLICATIONS

This application is a divisional application of (and claims the benefit of priority to) U.S. patent application Ser. No. 11/733,728, filed Apr. 10, 2007, now U.S. Pat. No. 7,773,325, which is a continuation of U.S. patent application Ser. No. 10/794,733, filed Mar. 5, 2004, now U.S. Pat. No. 7,203,017, which claims the benefit of U.S. Provisional Application No. 60/505,602, filed on Sep. 23, 2003. The entire disclosure of each of these prior applications is incorporated herein by reference.

BACKGROUND

In many systems, data is transmitted or retrieved asynchronously, i.e., without any additional timing reference. However, the receiver or detector in the system must eventually process the data synchronously. To do this, the receiver or detector must recover the timing information (e.g., the "clock") from the data at the receive end.

Timing recovery is becoming a major challenge in data storage channels, such as in disk drive storage systems. As storage capacities and data rates increase, design tradeoffs may require that the storage channels operate in a noisier environment with higher raw error rates. However, more noise and more raw detection errors may make reliable timing recovery more difficult.

SUMMARY

A storage channel, e.g., for a disk drive system, may asynchronously sample and buffer an entire sector and then process the buffered sector to recover timing information. The system may then re-sample the buffered sector using the recovered timing information.

The storage channel may include a read head to read an analog waveform including a number of sectors from a storage medium. A sampler may sample the waveform at the Nyquist rate.

The storage channel may operate in an open-loop and utilize an exhaustive search to determine timing parameters. A timing recovery module may determine coefficients in a polynomial modeling frequency characteristics of the signal. A decoder may decode the buffered sector using a plurality of sets of timing parameters obtained from the exhaustive search and to determine an optimal set of timing parameters. A re-sampling module may then re-sample the buffered sector using the optimal set of timing parameters. The re-sampling module may interpolate data points in the buffered sector in response to the timing information.

In an embodiment, a timing recovery module may process the buffered sector bi-directionally. The timing recovery module may determine a first phase offset using information in a pre-amble of the sector, determine a second phase offset using information in a post-amble of the sector, and then determine a frequency offset from the first phase offset and the second phase offset.

The storage channel may operate in a closed-loop, processing the sector once, and feeding back information obtained during decoding to a timing loop. The timing recovery module may launch the timing loop in a tracking mode using the determined frequency offset. The decoder may decode the re-sampled data points in the buffered sector, and provide timing information obtained from said decoding to the timing loop.

DETAILED DESCRIPTION

Figure 1:
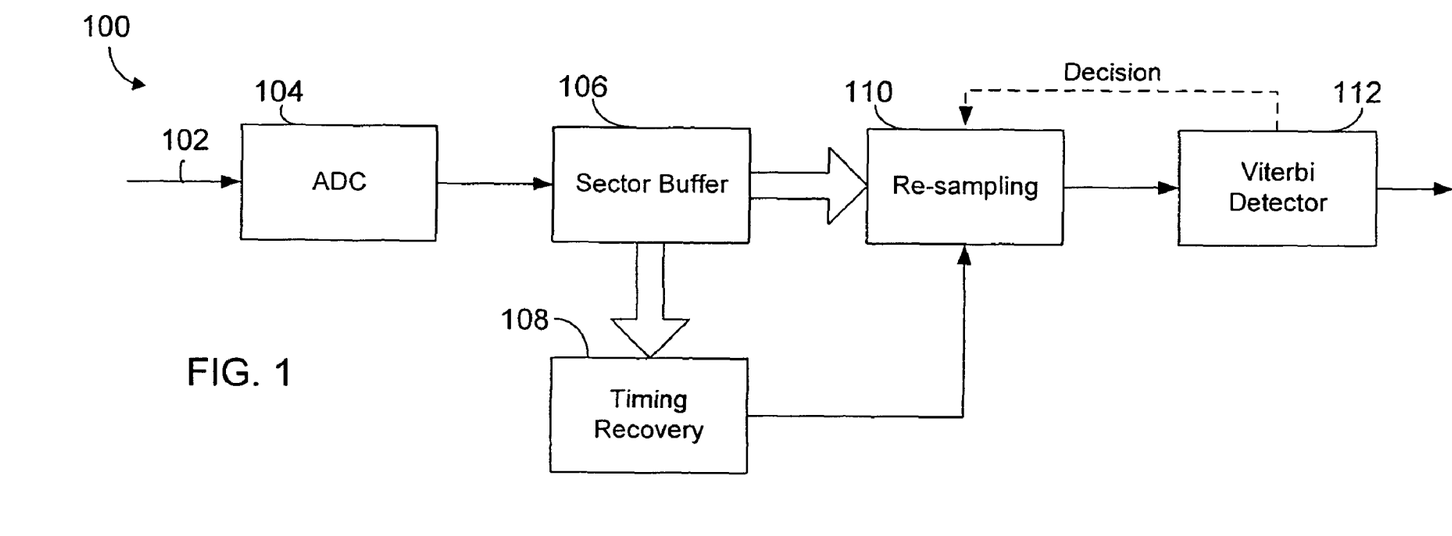
FIG. 1 is block diagram of a data storage channel with open-looped timing recovery.

FIG. 1 shows a communication channel 100 according to an embodiment. The communication channel may be a data storage channel implemented in a disk drive storage system. A read head may read data from a disk and input the data 102 to the storage channel as an analog waveform.

Figure 2:
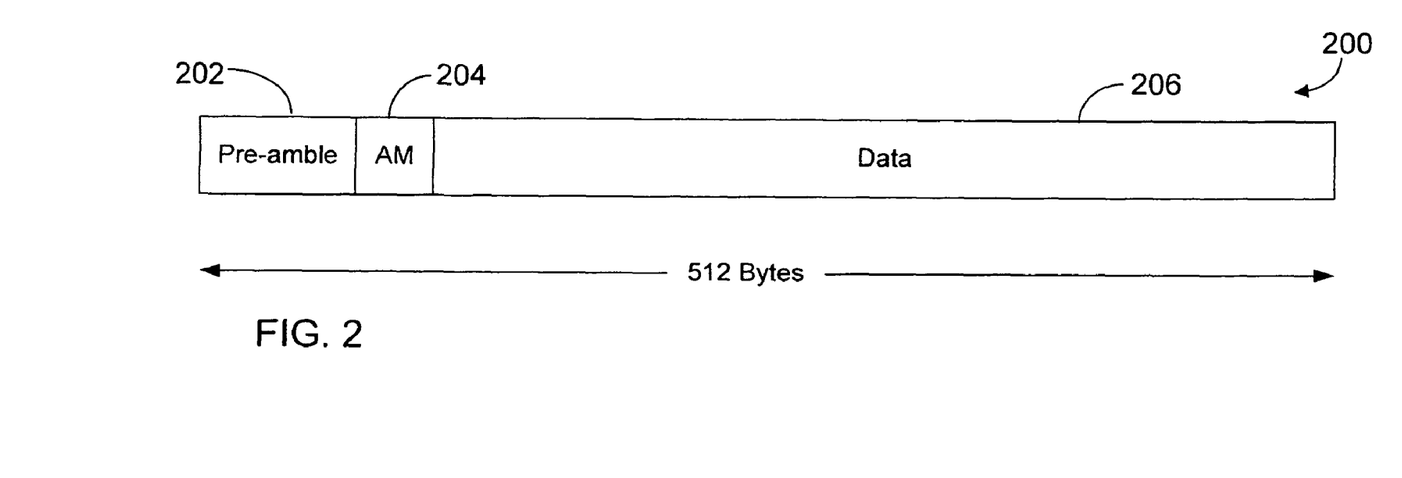
FIG. 2 is a block diagram illustrating a disk drive data sector format.

The data on the disk may be organized in sectors. FIG. 2 shows an exemplary sector format 200. The sector may be 512 bytes (4096 bits) long and include a preamble 202, an address mark 204, and data 206.

Figure 3:
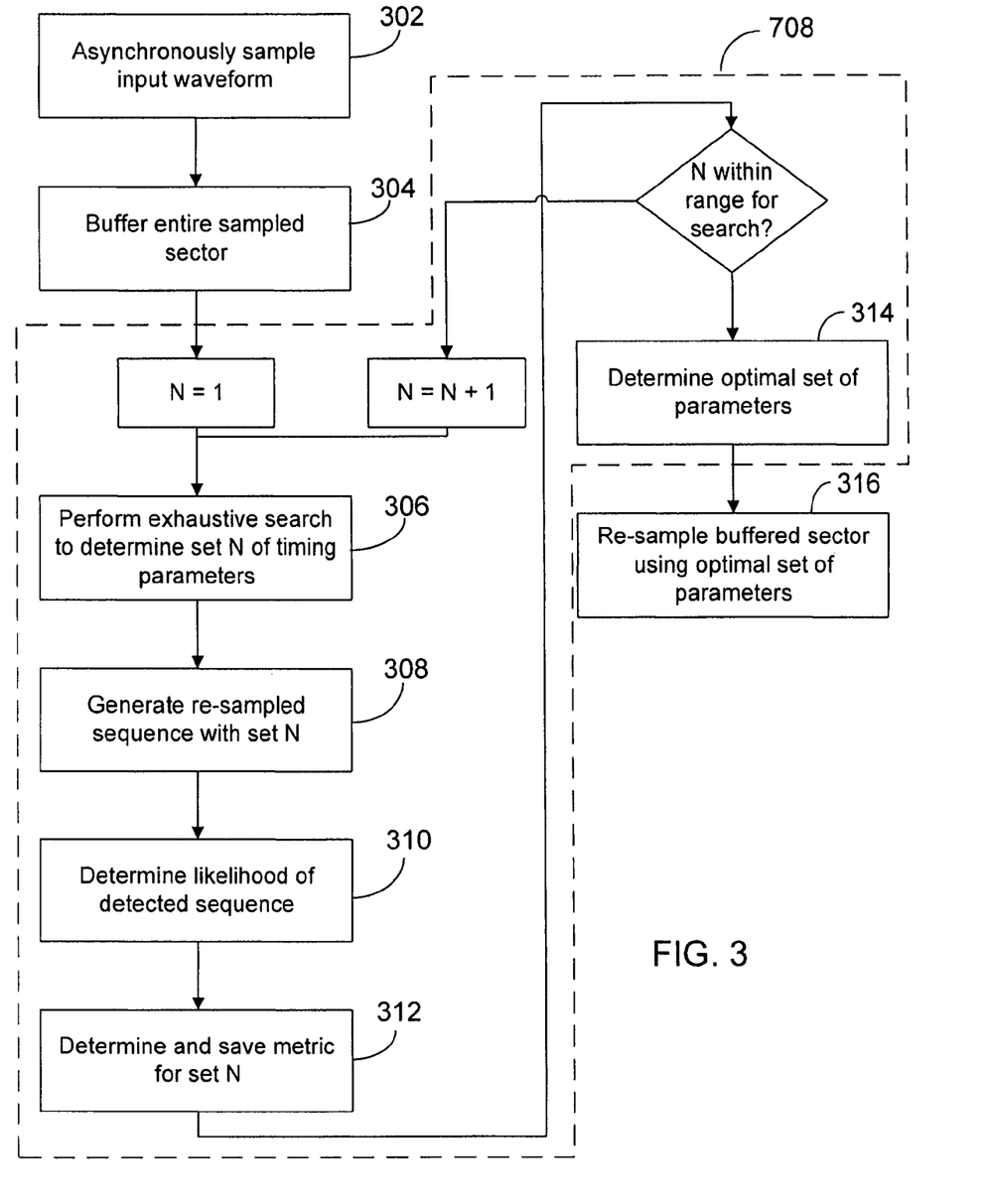
FIG. 3 is a flowchart describing a timing recovery operation using an open-loop approach.

FIG. 3 is a flowchart describing a timing recovery operation according to an embodiment. The input waveform may be asynchronously sampled by an analog-to-digital converter 104 (block 302). The storage channel samples the waveform at a sampling rate of at least the Nyquist rate, which is at least twice as fast as the maximum frequency component of the waveform. The Nyquist rate is the sampling rate necessary to cover the complete spectrum of the signal and accurately recover the continuous waveform. Consequently, the storage channel can recover the continuous-time waveform and, if necessary, reconstruct the value of the waveform at any instant by interpolation without loss of information.

In an embodiment, the storage channel may buffer an entire sector in a buffer 106 (block 304). The buffered sector may be processed for timing information by a timing recovery module 108. A re-sampling module 110 may use the recovered clock to re-sample the buffered sector, which may then be processed by a Viterbi detector 112 to estimate the actual signal.

Timing recovery basically deals with two variables: frequency (f) and phase ($\phi$). Once the initial phase offset and frequency offset values are decided, there is a deterministic relationship between the phase and frequency at any time, which is that the phase is the time-integration of the frequency, i.e., $$\phi(t) = \int_0^t f(t)\,dt + \phi(0).$$

The initial phase offset can be any value between 0 and 1.0 T, where T is the length of one clock cycle. The initial frequency offset is usually very small, with typical values being smaller than +/−0.5%. Also, the frequency drift over the duration of one sector is either a very small value or virtually zero. Therefore, it can be assumed that with regard to the sampling frequency, the data frequency is either constant or a function of time that can be characterized by a low-order (e.g., third order or lower) polynomial.

Since there are only a few parameters to estimate regarding the timing recovery, an exhaustive search may be performed to find the optimal values of these parameters (block 306). The initial phase offset may be estimated using phase acquisition information provided in the preamble of the sector. For example, a Zero Phase Start (ZPS) technique may be utilized. ZPS information may be provided in the preamble at the beginning of a sector. ZPS is a technique that provides a way to quickly determine the sampling phase. A known portion of the signal, e.g., a sinusoidal waveform, may be sampled at four samples per cycle. With zero phase offset, the samples would be taken at the peak and zero crossing points on the waveform. The sampling phase may be determined by calculating the offset between the samples and the peak and zero crossing points.

The ZPS should provide an accurate estimate of the phase offset at the beginning of the sector. Even if exhaustive search is needed to estimate the initial phase offset, the search may be limited to a narrow range around the estimate produced by the ZPS operation and will not be dominant in deciding the complexity of computation. As described above, the frequency characteristics of the sector may be modeled by a low order polynomial (e.g., $f(t) = f_0 + f_1 x + f_2 x^2 + f_3 x^3$). For the exhaustive search of the frequency parameters $f_0, f_1, f_2, f_3$, the zero-order term, $f_0$, (i.e., the initial frequency offset) and the first-order term, $f_1$, (i.e., the drifting rate of the frequency during a sector) will be the most important two terms to decide. Their range of search and accuracy will be the deciding factors for the computational complexity of the exhaustive search. The second- and third-order terms ($f_2$ and $f_3$) are likely to be insignificant. The limits, and step size(s), of the exhaustive searches may be predetermined, e.g., set by the disk drive manufacturer based on known tolerances.

A Maximum-likelihood (ML) criterion may be used to determine the optimal parameters. A re-sampled sequence may be generated using the timing decided by each combination of the phase and frequency parameters and loss-free interpolation (block 308). Viterbi detection may then be performed on the re-sampled sequence, and the likelihood of the detected sequence calculated (block 310). The likelihood may be indicated by a metric such as the mean square error (MSE), Euclidian distance, and/or their modified versions with non-linear pattern-dependent effects taken into account. The metric may be stored for each set of parameters (block 312). The optimal set of parameters is the one that gives the maximum likelihood (block 314). The parameters corresponding to the maximum likelihood decision may be provided to the re-sampling module 110 and the buffered sector re-sampled using the optimal set of parameters (block 316).

In the embodiment described above, timing recovery is operating in an open-loop (i.e., without a traditional timing loop). However, the exhaustive search techniques may require a significant amount of computational complexity, which translates into computation time and cost.

Figure 4:
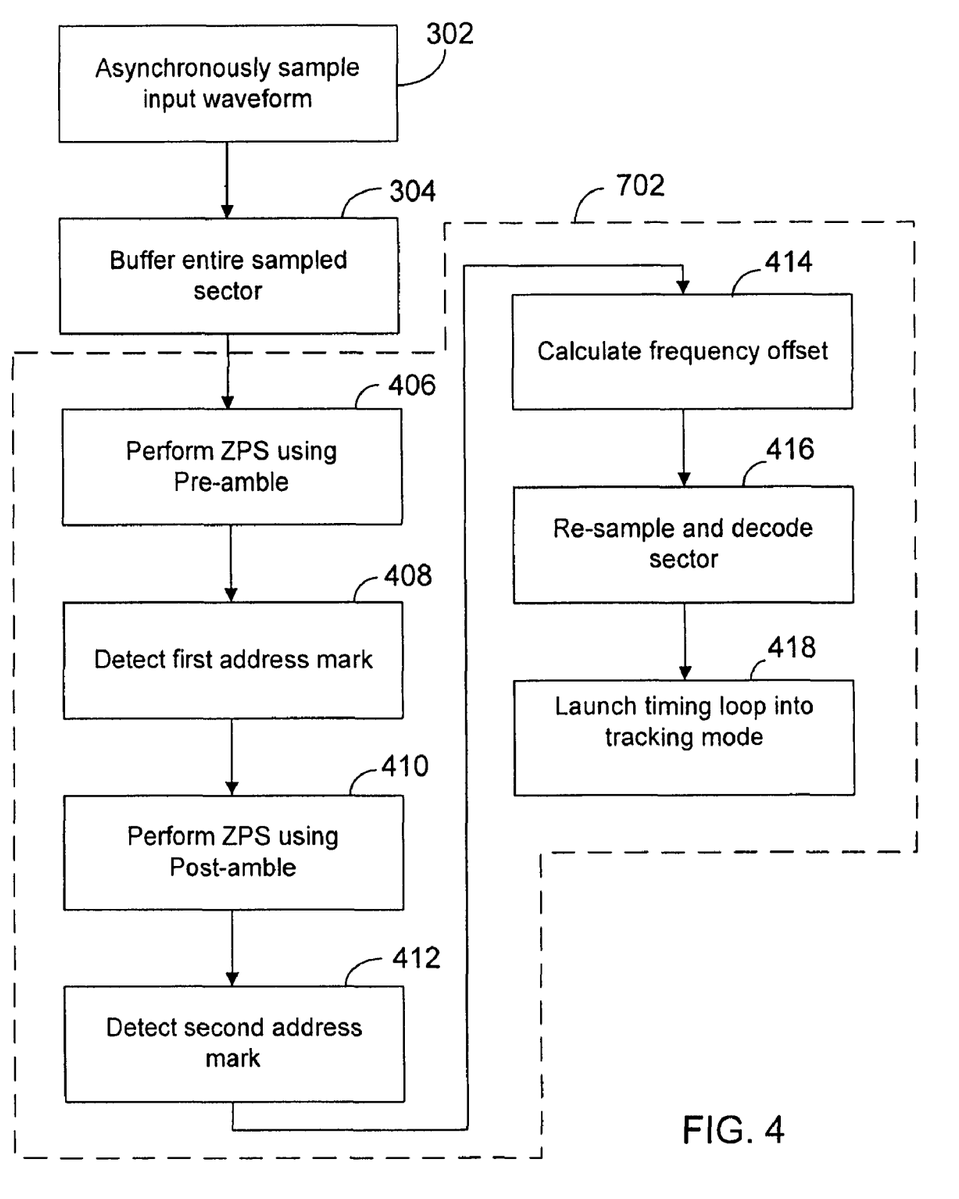
FIG. 4 is a flowchart describing a timing recover operation using a closed-loop approach.
Figure 5:
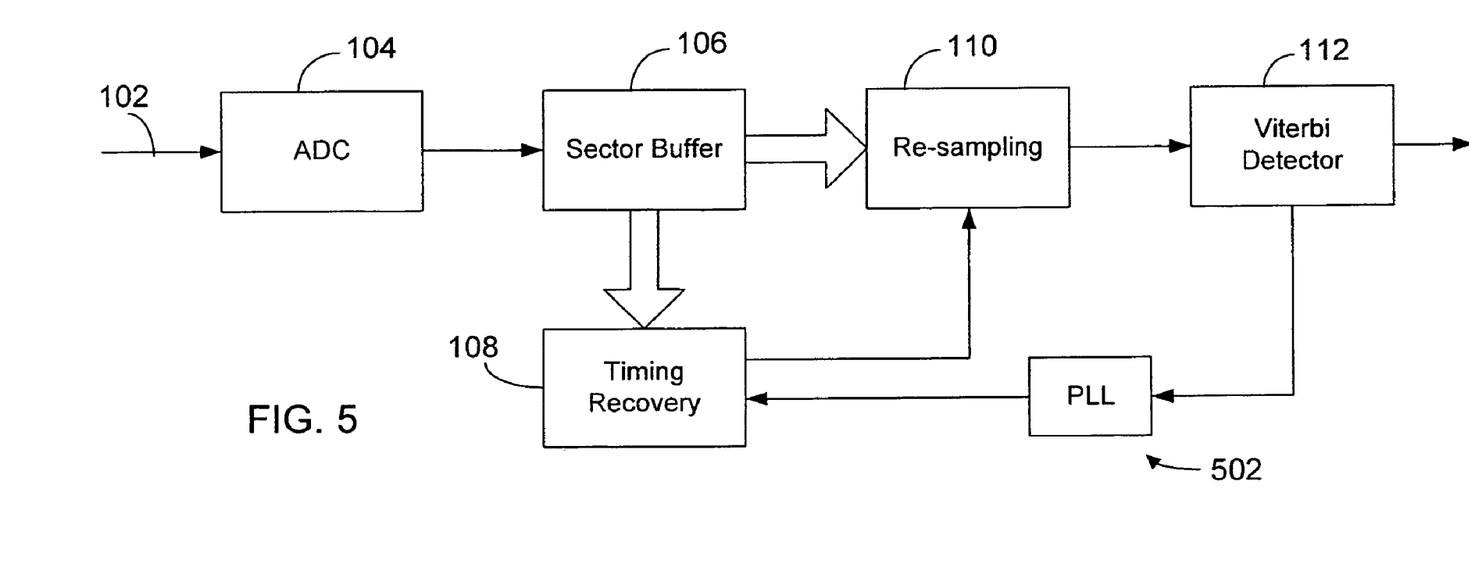
FIG. 5 is a block diagram of a data storage channel with closed-loop timing recovery.

In an embodiment, timing recovery may be performed by processing the buffered sector only once (in a bi-directional process) in order to save computational resources. FIG. 4 is a flowchart describing a timing recover operation using a closed-loop approach. The complete sector may be sampled asynchronously at the Nyquist rate (possibly higher) (block 302) and then buffered (block 304). The data storage channel 500 may include a timing loop 502 (e.g., phase locked loop (PLL) 502), as shown in FIG. 5.

Figure 6:
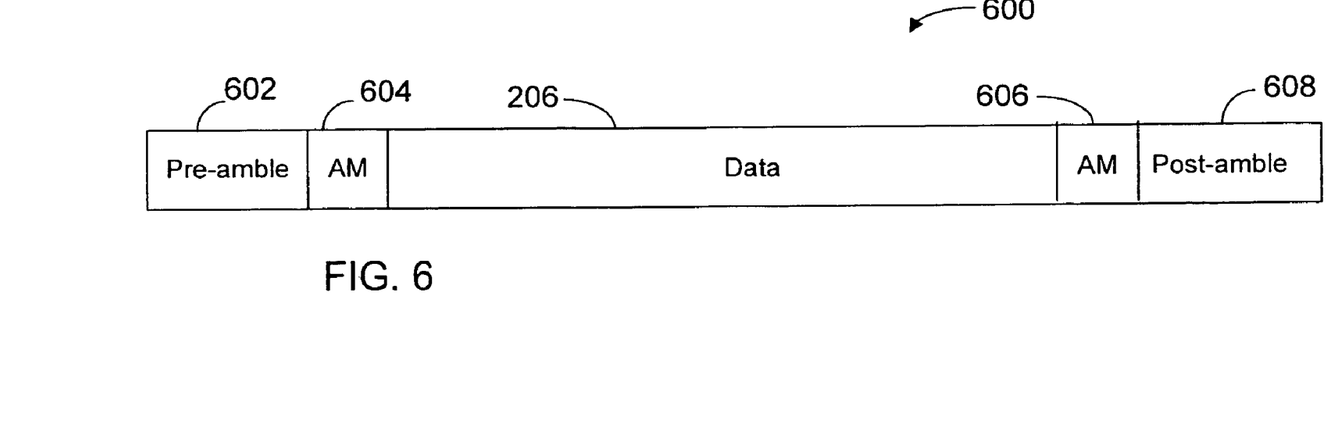
FIG. 6 is a block diagram illustrating a bi-directional processing data sector format.

The format 600 of the sector may be modified, as shown in FIG. 6, so that the sector can be processed from front-to-back and back-to-front. In many systems, the preamble is used for frequency and phase acquisition, with a length of about 120 bits. In the sector format shown in FIG. 6, the preamble may be shortened to a length just long enough to perform a reliable ZPS (block 406), even in the presence of a bit error rate (BER) of $1e^{-2}$, e.g., about 16-bits, or 32-bits for a more reliable estimate. Then based on this ZPS, and with a close enough estimation of frequency, the address mark at the beginning of the sector can be detected (block 408). Another address mark 606 and a post-amble 608 may be added to the end of the sector. The post-amble may be just long enough to perform another ZPS (block 410). Based on the ZPS from the post-amble bits, the second address mark can be detected by processing the sector backwards (block 412). Since the time interval between the two address marks can be decided with an accuracy within a fraction of a sampling clock cycle, and the number of data bits between the two address marks is known, a very accurate average frequency offset can be calculated (block 414). If the frequency is not drifting noticeably over one sector, then the calculated average frequency offset can be used as initial frequency offset for the timing loop (block 416). The timing loop can then be launched into the tracking mode (block 418). As long as the initial frequency error is smaller than +/−0.1%, the tracking-mode timing loop can start operating reliably. Timing information may be fed back to the timing loop from the Viterbi detector as it processes the re-sampled and interpolated data points in the buffered sector (block 420).

Figure 7:
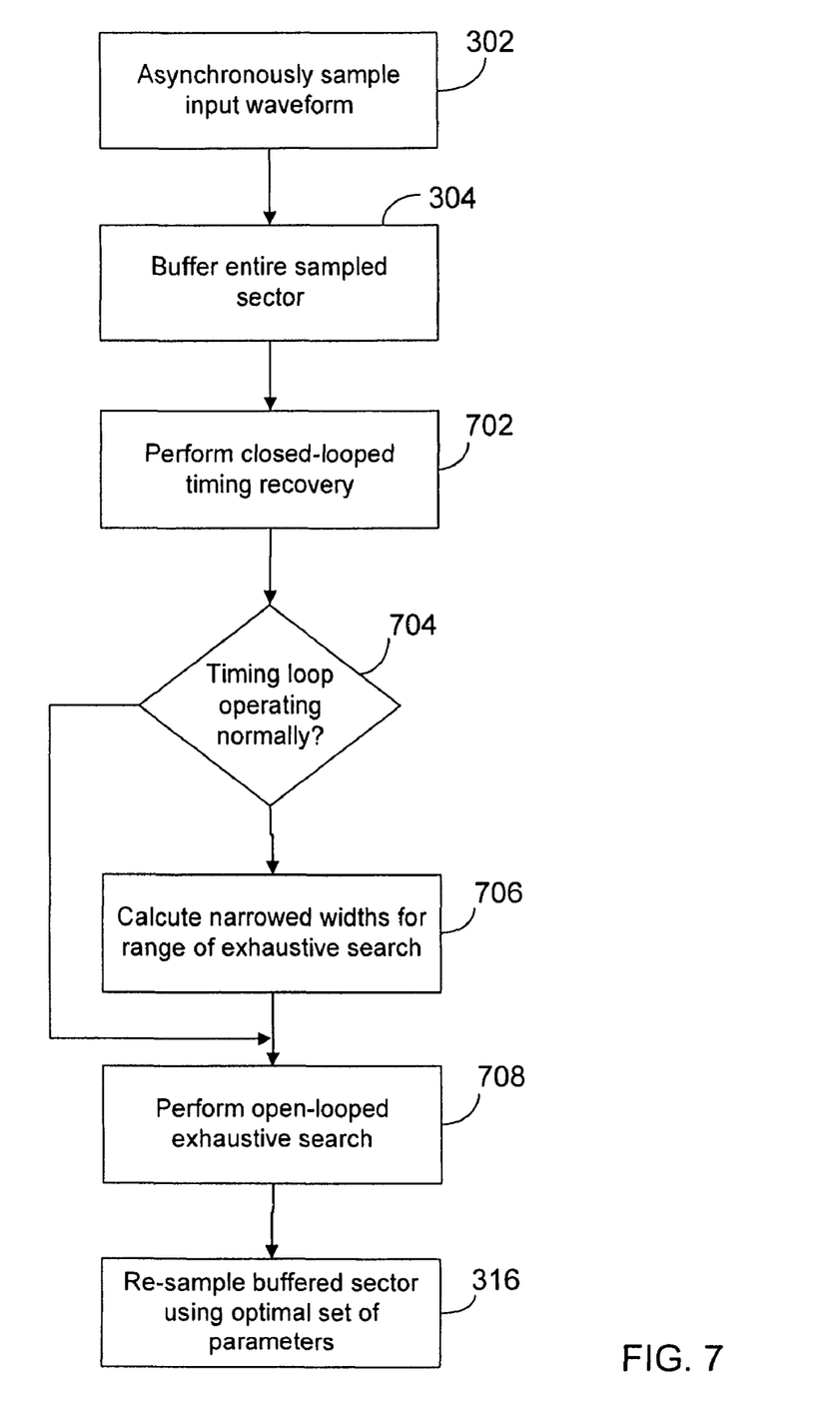
FIG. 7 is a flowchart describing a timing recovery operation using a combination open-looped/close-looped approach.

In alternative embodiments, combinations of the open-looped exhaustive search and the close-looped processing may be used. For example, the bi-directional sector format 600 shown in FIG. 6 can also be used with the open-looped, exhaustive search technique. With the ending phase value and average frequency offset known, the exhaustive search can be performed in much narrower ranges and therefore significantly expedited. FIG. 7 is a flowchart describing a timing recovery operation using a combined open-looped/close-looped approach. A close-looped timing recovery (block 702, shown in detail in FIG. 4) can be performed first by utilizing the information of the averaged frequency offset over a buffered sector. If at the end of the sector, the timing loop appears to have operated normally (block 704), which can be indicated by the end phase value, averaged frequency register value, and abruptness of phase changes, then the history of the frequency register value can be used as a good starting curve and a good indicator of the widths of the ranges for the exhaustive search. Narrowed widths for a range of search based on these indicators may be calculated (block 706), and an open-looped exhaustive search performed in the narrowed ranges (block 708, shown in detail in FIG. 3). The combined open-looped/close-looped approach may improve the overall channel performance by removing timing jitter.

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

The invention claimed is:

1. A method comprising:
   asynchronously sampling a signal including a sector;
   buffering the sector;

processing the buffered sector to recover timing information, wherein said processing comprises determining the timing information from processing the buffered sector a first time and in a first direction from a beginning of the buffered sector to an end of the buffered sector, and a second time and in a second direction from the end of the buffered sector to the beginning of the buffered sector; and re-sampling the buffered sector using the timing information to produce re-sampled data points.

2. The method of claim 1, wherein the sector includes:
a pre-amble;
a post-amble;
a first address mark after the pre-amble;
a second address mark before the post-amble; and
a pre-determined number of data bits between the first address mark and the second address mark, and
wherein said processing comprising:
determining a first phase offset using information in a pre-amble of the sector;
determining a second phase offset using information in a post-amble of the sector;
finding the first address mark;
finding the second address mark;
counting a number of samples between the first address mark and the second address mark; and
determining a frequency offset from the first phase offset, the second phase offset, the number of samples, and the pre-determined number of data bits.

3. The method of claim 2, further comprising:
launching a timing loop in a tracking mode using the determined frequency offset.

4. The method of claim 3, further comprising:
decoding the re-sampled data points in the buffered sector; and
providing timing information obtained from said decoding to the timing loop.

5. An apparatus comprising:
a buffer to receive and buffer an input sampled sector from a sampler;
a timing recovery module to recover timing information from the buffered sector, wherein the timing recovery module is operative to determine the timing information from processing the buffered sector a first time and in a first direction from a beginning of the buffered sector to an end of the buffered sector, and a second time and in a second direction from the end of the buffered sector to the beginning of the buffered sector; and
a re-sampling module to re-sample the buffered sector using the timing information from the timing recovery module to produce re-sampled data points.

6. The apparatus of claim 5, wherein the sector includes:
a pre-amble;
a post-amble;
a first address mark after the pre-amble;
a second address mark before the post-amble; and
a pre-determined number of data bits between the first address mark and the second address mark, and
wherein the timing recovery module is operative to:
determine a first phase offset using information in a pre-amble of the sector;
determine a second phase offset using information in a post-amble of the sector;
find the first address mark;
find the second address mark;
count a number of samples between the first address mark and the second address mark; and
determine a frequency offset from the first phase offset, the second phase offset, the number of samples, and the pre-determined number of data bits.

7. The apparatus of claim 6, further comprising a timing loop,
wherein the timing recovery module is operative to launch the timing loop in a tracking mode using the determined frequency offset.

8. The apparatus of claim 7, further comprising a decoder that is operative to:
decode the re-sampled data points in the buffered sector; and
provide timing information obtained from said decoding to the timing loop.

9. An apparatus comprising:
means for buffering an input sampled sector from a sampler;
means for recovering timing information from the buffered sector, the means for recovering timing information including means for determining the timing information from processing the buffered sector a first time and in a first direction from a beginning of the buffered sector to an end of the buffered sector, and a second time and in a second direction from the end of the buffered sector to the beginning of the buffered sector; and
means for re-sampling the buffered sector using the timing information from the means for recovering timing information to produce re-sampled data points.

10. The apparatus of claim 9, wherein the sector includes:
a pre-amble;
a post-amble;
a first address mark after the pre-amble;
a second address mark before the post-amble; and
a pre-determined number of data bits between the first address mark and the second address mark, and
the apparatus further comprises:
means for determining a first phase offset using information in a pre-amble of the sector;
means for determining a second phase offset using information in a post-amble of the sector;
means for finding the first address mark;
means for finding the second address mark;
means for counting a number of samples between the first address mark and the second address mark; and
means for determining a frequency offset from the first phase offset, the second phase offset, the number of samples, and the pre-determined number of data bits.

11. The apparatus of claim 10, further comprising:
a timing loop; and
means for launching the timing loop in a tracking mode using the determined frequency offset.

12. The apparatus of claim 11, further comprising:
means for decoding the re-sampled data points in the buffered sector; and
means for providing timing information obtained from said means for decoding to the timing loop.

13. A non-transitory computer-readable storage medium having instructions stored thereon, which, when executed by a processor, causes the processor to perform operations comprising:
asynchronously sampling a signal including a sector;
buffering the sector;
processing the buffered sector to recover timing information, wherein said processing comprises determining the timing information from processing the buffered sector a first time and in a first direction from a beginning of the buffered sector to an end of the buffered sector, and a second time and in a second direction from the end of the buffered sector to the beginning of the buffered sector; and re-sampling the buffered sector using the timing information to produce re-sampled data points.

14. The computer-readable medium of claim 13, wherein the sector includes:
a pre-amble;
a post-amble;
a first address mark after the pre-amble;
a second address mark before the post-amble; and
a pre-determined number of data bits between the first address mark and the second address mark, and
wherein said processing comprises:
determining a first phase offset using information in a pre-amble of the sector;
determining a second phase offset using information in a post-amble of the sector;
finding the first address mark;
finding the second address mark;
counting a number of samples between the first address mark and the second address mark; and
determining a frequency offset from the first phase offset, the second phase offset, the number of samples, and the pre-determined number of data bits.

15. The computer-readable medium of claim 14, the operations further comprising:
launching a timing loop in a tracking mode using the determined frequency offset.

16. The computer-readable medium of claim 15, the operations further comprising:
decoding the re-sampled data points in the buffered sector; and
providing timing information obtained from said decoding to the timing loop.

17. A storage system comprising:
a read head to read data; and
a storage channel to receive said data, the storage channel including
a buffer to receive and buffer an input sampled sector from a sampler,
a timing recovery module to recover timing information from the buffered sector, wherein the timing recovery module is operative to determine the timing information from processing the buffered sector a first time and in a first direction from a beginning of the buffered sector to an end of the buffered sector, and a second time and in a second direction from the end of the buffered sector to the beginning of the buffered sector, and
a re-sampling module to re-sample the buffered sector using the timing information from the timing recovery module to produce re-sampled data points.

18. The system of claim 17, wherein the sector includes:
a pre-amble;
a post-amble;
a first address mark after the pre-amble;
a second address mark before the post-amble; and
a pre-determined number of data bits between the first address mark and the second address mark, and
wherein the timing recovery module is operative to:
determine a first phase offset using information in a pre-amble of the sector;
determine a second phase offset using information in a post-amble of the sector;
find the first address mark;
find the second address mark;
count a number of samples between the first address mark and the second address mark; and
determine a frequency offset from the first phase offset, the second phase offset, the number of samples, and the pre-determined number of data bits.

19. The system of claim 18, further comprising a timing loop,
wherein the timing recovery module is operative to launch the timing loop in a tracking mode using the determined frequency offset.

20. The system of claim 19, further comprising a decoder that is operative to:
decode the re-sampled data points in the buffered sector; and
provide timing information obtained from said decoding to the timing loop.

* * * * *